(12) United States Patent
Lynch et al.

(10) Patent No.: US 7,721,499 B2
(45) Date of Patent: *May 25, 2010

(54) REVERSE MOLDED PANEL

(75) Inventors: Steven K. Lynch, St. Charles, IL (US);
Dale E. Schafernak, Palatine, IL (US);
Karine Luetgert, Geneva, IL (US);
Bei-Hong Liang, Naperville, IL (US);
Lee Braddock, Huntley, IL (US)

(73) Assignee: Masonite Corporation, Tampa, FL (US)

( * ) Notice: Subject to any disclaimer, the term of this patent is extended or adjusted under 35 U.S.C. 154(b) by 1342 days.

This patent is subject to a terminal disclaimer.

(21) Appl. No.: 10/285,430

(22) Filed: Nov. 1, 2002

(65) Prior Publication Data

US 2003/0051425 A1 Mar. 20, 2003

Related U.S. Application Data

(63) Continuation of application No. 09/761,394, filed on Jan. 16, 2001, now Pat. No. 6,588,162, which is a continuation-in-part of application No. 09/742,840, filed on Dec. 21, 2000, now abandoned.

(60) Provisional application No. 60/198,709, filed on Apr. 20, 2000.

(51) Int. Cl.
*E06B 3/08* (2006.01)
*E06B 3/72* (2006.01)
*E06B 5/00* (2006.01)
*E06B 3/10* (2006.01)

(52) U.S. Cl. .................. 52/455; 52/745.15; 52/745.16; 52/745.19; 52/783.12; 428/156; 428/170; 428/171

(58) Field of Classification Search .............. 428/537.1, 428/109, 156, 170–171, 248, 281, 286, 290, 428/326, 542.9, 407, 209, 535; 264/120, 264/122, 112–113, 119, 316, 109, 511, 266–267, 264/73, 74, 137, 162, 219, 129, 297.1, 132, 264/261, 257–258, 193; 52/455–458, 745.15, 52/745.16, 783.12; 427/290, 334, 368, 371, 427/340, 417, 389.9, 393.5, 407.3, 412.1
See application file for complete search history.

(56) References Cited

U.S. PATENT DOCUMENTS 3,402,520 A 9/1968 Lee (Continued)

FOREIGN PATENT DOCUMENTS

DE 30 45 702 A1 7/1942

(Continued)

*Primary Examiner*—Jeanette Chapman
(74) *Attorney, Agent, or Firm*—Berenato & White, LLC

(57) ABSTRACT

A reverse molded fiberboard panel; a wainscot kit comprising a plurality of differently sized reverse molded panels, and a planar finishing or spacer panel, adapted to completely cover any size wall between a wall base board and a wall chair rail; and a method of reverse molding a loose cellulosic mat, in a single pressing step, to provide one or more relatively high density, raised panels without requiring preliminary pressing, or other pre-shaping step, such as scalping. The reverse-molded panels are molded in a conventional, multi-opening fiberboard press, in a single pressing step process, while achieving excellent transfer of mold detail (embossing fidelity) without visually noticeable fiber fracture.

24 Claims, 6 Drawing Sheets

U.S. PATENT DOCUMENTS

| | | | |
|---|---|---|---|
| 3,634,986 A | 1/1972 | Ford | |
| 4,061,813 A | 12/1977 | Geimer | |
| 4,159,302 A | 6/1979 | Greve | |
| 4,236,365 A | 12/1980 | Wheeler | |
| 4,265,067 A | 5/1981 | Palmer | |
| 4,378,265 A | 3/1983 | Kiss | |
| 4,381,328 A | 4/1983 | Bunner | |
| 4,550,540 A | 11/1985 | Thorn | |
| 4,552,797 A | 11/1985 | Munk | |
| 4,610,900 A | 9/1986 | Nishibori | |
| 4,612,224 A | 9/1986 | Davis | |
| 4,622,190 A | 11/1986 | Schultz | |
| 4,726,881 A * | 2/1988 | Schultz | 162/109 |
| 4,734,236 A | 3/1988 | Davis | |
| 4,812,188 A | 3/1989 | Hansen | |
| 4,844,968 A | 7/1989 | Persson et al. | |
| 4,865,788 A | 9/1989 | Davis | |
| 4,960,548 A | 10/1990 | Ikeda | |
| 4,960,553 A | 10/1990 | DeBruine | |
| 4,969,302 A | 11/1990 | Coggan | |
| 5,016,414 A | 5/1991 | Wang | |
| 5,028,374 A | 7/1991 | Imao | |
| 5,074,087 A * | 12/1991 | Green | 52/309.9 |
| 5,075,059 A * | 12/1991 | Green | 264/129 |
| 5,090,173 A | 2/1992 | Coggan | |
| 5,142,835 A | 9/1992 | Mrocca | |
| 5,158,968 A | 10/1992 | Kehne | |
| 5,175,970 A | 1/1993 | Green | |
| 5,397,406 A | 3/1995 | Vaders | |
| 5,443,891 A | 8/1995 | Bach | |
| 5,470,631 A | 11/1995 | Lindquist | |
| 5,525,394 A | 6/1996 | Clarke | |
| 5,534,352 A | 7/1996 | Pittman | |
| 5,543,234 A | 8/1996 | Lynch | |
| 5,598,667 A | 2/1997 | Dykes | |
| 5,614,231 A | 3/1997 | Rinker | |
| 5,647,934 A | 7/1997 | Vaders | |
| D382,350 S | 8/1997 | Lynch | |
| 5,674,934 A * | 10/1997 | Schmidt et al. | 524/555 |
| 5,718,786 A | 2/1998 | Lindquist | |
| 5,766,774 A | 6/1998 | Lynch | |
| 5,782,055 A * | 7/1998 | Crittenden | 52/784.1 |
| 5,851,325 A * | 12/1998 | Terada et al. | 156/62.2 |
| 5,887,402 A * | 3/1999 | Ruggie et al. | 52/455 |
| 6,103,167 A * | 8/2000 | Mukai et al. | 264/255 |
| 6,161,363 A | 12/2000 | Herbst | |
| 6,189,276 B1 | 2/2001 | Pinto | |
| 6,200,687 B1 * | 3/2001 | Smith et al. | 428/537.1 |
| 6,226,958 B1 | 5/2001 | West | |
| 6,312,540 B1 | 11/2001 | Moyes | |
| 6,364,982 B1 | 4/2002 | Lynch | |
| 6,389,768 B1 * | 5/2002 | Gagne et al. | 52/309.9 |
| 6,397,541 B1 * | 6/2002 | Brewer | 52/316 |
| 6,584,743 B2 | 7/2003 | Paxton | |
| 6,588,162 B2 | 7/2003 | Lynch et al. | |
| 6,602,610 B2 | 8/2003 | Smith et al. | |
| 6,773,791 B1 | 8/2004 | Ruggie et al. | |
| 7,021,015 B2 | 4/2006 | Lynch et al. | |
| 2001/0029714 A1 | 10/2001 | Lynch et al. | |
| 2001/0030016 A1 | 10/2001 | Lynch | |
| 2002/0108337 A1 | 8/2002 | Clarke | |
| 2002/0174615 A1 | 11/2002 | Bell | |
| 2003/0196396 A1 | 10/2003 | Lynch et al. | |
| 2004/0035085 A1 | 2/2004 | Crittenden | |
| 2004/0074186 A1 | 4/2004 | Lynch et al. | |

FOREIGN PATENT DOCUMENTS

| | | |
|---|---|---|
| DE | 1 210 551 | 2/1966 |
| DE | 1 912 300 | 10/1969 |
| DE | 1 092 183 | 11/1969 |
| DE | 2 142 003 | 3/1973 |
| DE | 2316 250 | 10/1974 |
| DE | 23 39 796 | 3/1975 |
| DE | 24 37 131 | 2/1976 |
| DE | 25 37 766 | 3/1977 |
| DE | 29 44 843 A1 | 5/1981 |
| DE | 3419824 A1 | 11/1985 |
| DE | 40 30 586 A1 | 4/1991 |
| DE | 296 03 593 U1 | 5/1991 |
| DE | 37 12 972 C2 | 7/1998 |
| DE | 695 13 400 T2 | 5/2000 |
| DE | 101 34 673 A1 | 4/2002 |
| DE | 695 22 506 T2 | 5/2002 |
| EP | 0225 629 | 6/1987 |
| EP | 0228 628 | 6/1987 |
| EP | 0 246 208 B1 | 8/1990 |
| EP | 0 365 616 A1 | 1/1995 |
| EP | 0 688 639 A2 | 12/1995 |
| EP | 0 770 077 B1 | 11/1999 |
| EP | 1 066 936 A1 | 7/2000 |
| EP | 1 190 925 A2 | 3/2001 |
| FR | 1409.105 | 9/1964 |
| FR | 2.144.876 | 7/1972 |
| GB | 937 710 | 9/1963 |
| GB | 1099524 | 1/1968 |
| GB | 2 024 084 A | 1/1980 |
| GB | 2 080 721 A | 2/1982 |
| GB | 2 237 040 A | 4/1991 |
| JP | 53-47623 | 4/1974 |
| JP | 55-164142 | 12/1980 |
| JP | 57-6745 | 1/1982 |
| JP | 59-59433 | 4/1984 |
| WO | WO 87/02407 | 4/1987 |
| WO | WO 96/02395 | 2/1996 |
| WO | WO 99/62680 | 12/1999 |
| WO | WO 00/04249 | 1/2000 |
| WO | WO 00/67972 | 11/2000 |
| WO | WO 01 21369 | 3/2001 |
| WO | WO 01/38058 A1 | 8/2001 |

* cited by examiner

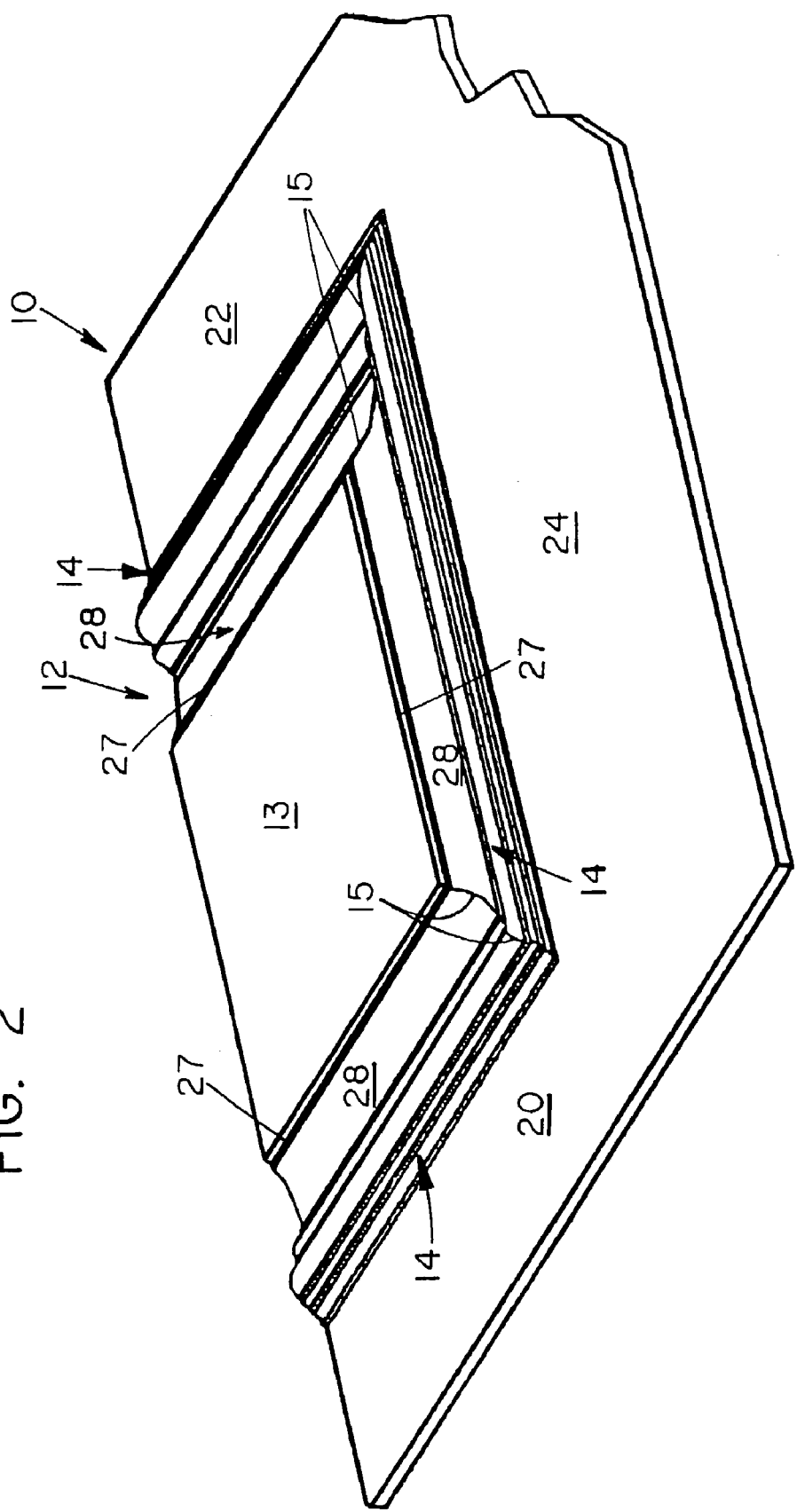

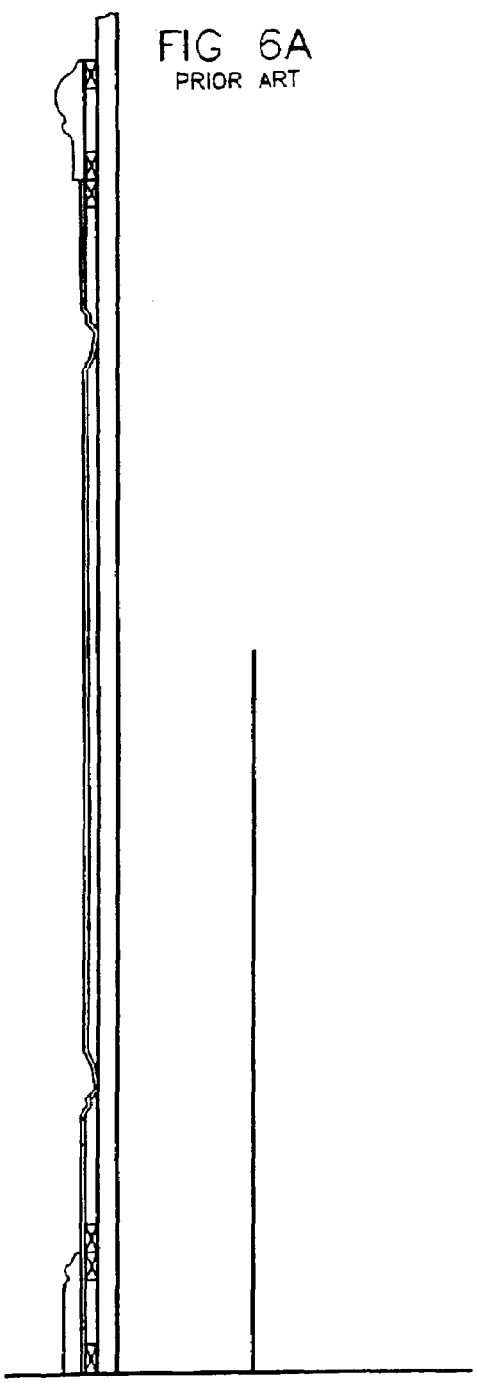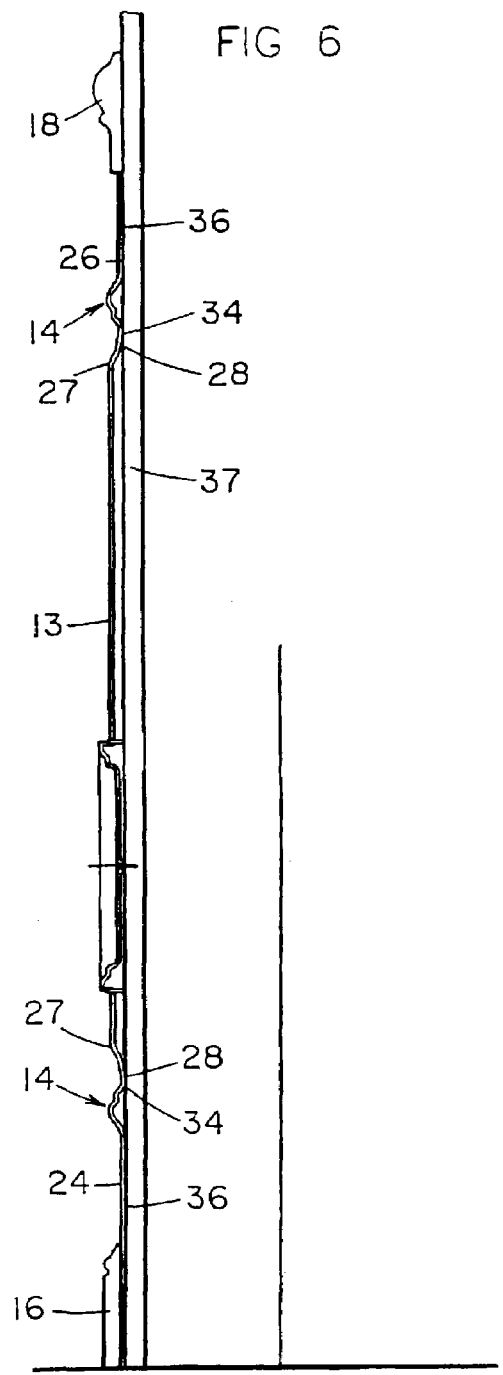

REVERSE MOLDED PANEL

CROSS-REFERENCE TO RELATED APPLICATION

This application is a continuation of U.S. application Ser. No. 09/761,394 (now U.S. Pat. No. 6,588,162), entitled Reverse Molded Panel, filed Jan. 16, 2001, which is a continuation-in-part of U.S. application Ser. No. 09/742,840 filed Dec. 21, 2000 now abandoned which is based on U.S. Provisional Patent Application Ser. No. 60/198,709 filed Apr. 20, 2000, of which the benefit of priority is claimed.

FIELD OF THE INVENTION

The present invention relates to a reverse molded (profile up, as molded) wood composite article particularly useful for the manufacture of a wainscot panel, and also useful as a door skin or door-facing surface, and to a method of making the reverse molded wood composite article, having an upwardly inclined profile molded upwardly from a planar base portion of the article. More particularly, the molded wood composite article of the present invention is made from a cellulosic mat containing a combination of cellulosic fibers, preferably including at least about 40% by weight, preferably at least about 60%, softwood fibers, (from trees that produce cones) such as all species of pine, and fir, e.g., Southern Pine, based on the total dry fiber weight, and a natural or synthetic binder, such as a phenol formaldehyde or urea formaldehyde resin. The cellulosic mat includes at least about 80% refined, fibrillated cellulosic fibers, e.g., a fiberboard mat, such as that hot-pressed to produce hardboard. The upper surface of the molded article has excellent molding die fidelity and may have a smooth finish or may be embossed to simulate a hardwood grain pattern, such as oak, simulating furniture grade natural wood. The articles are molded from a planar layer or mat of cellulosic fibers, e.g., a fiberboard mat, made either by the wet process or the dry process, preferably the dry process. In a preferred embodiment, the fiberboard mat is one to three inches in thickness before molding, and after molding is ⅛ to ¼ inch in thickness having co-planar stiles and rails, and planar back surfaces surrounding the molded panels, such that the co-planar back surfaces are adapted for flush contact against a wall or door surface, particularly between a wall base board and chair rail, as a wainscot outer wall surface lining for an interior household wall. In accordance with another embodiment of the invention, the reverse molded panels are manufactured in a kit, including a plurality of differently sized panels adapted to completely line an interior wall, regardless of wall dimension.

BACKGROUND OF THE INVENTION

Man-made boards, such as fiberboard, e.g., hardboard, commonly are embossed downwardly on their intended visible major outer surface in the manufacture of interior paneling, exterior siding, and particularly in the manufacture of door skins, such that exterior surfaces, such as stiles and rails, are the highest structure of the embossed product. The prior art discloses that it is difficult to reverse mold and to emboss deep draws into a fiberboard panel due to stretching and breaking of the fibers. A reverse molded fiberboard is stretched more on its visible outer surface than on its interior surface (surface in contact with a raised mold surface) making reverse molding much more difficult when attempting to provide sharp, crisp design detail in a raised panel that simulates natural wood millwork. As disclosed in the following U.S. patents, reverse molding and embossing deep draws into a fiberboard panel generally requires one or more of multiple press steps, post mold curing at elevated temperatures, a foil or high resin content outer surface portion, and/or high binder resin content of about 5-25%, preferably at least 10% by weight of the product: U.S. Pat. Nos. 4,061,813 Geimer; 4,378,265 Kiss; 4,552,797 Munk; 4,610,900 Nishibori; 4,612,224 Davis; 4,622,190 Schultz; 4,726,881 Schultz; 4,734,236 Davis; 4,812,188 Hansen; 4,844,968 Persson; 4,865,788 Davis; 4,960,548 Ikeda; 4,960,553 DeBruine; 4,969,302 Coggan; 5,028,374 Imao; 5,090,173 Coggan; 5,154,968 DePetris; 5,443,891 Bach; 5,851,325 Terada; 5,887,402 Ruggie;

The cellulosic fibers used to form the loose mat, e.g., a one to two inch, preferably a 1½ or 1¾ inch thick layer of cellulosic fibers having a specific gravity of, for example, 0.6, initially may be bone dry after the fibers have been dried and felted, but the cellulosic fibers in such mats absorb moisture from the atmosphere and generally include about 2% to about 10% moisture when molded via hot pressing, depending upon the humidity in the region where such mats are stored and/or manufactured.

The reverse molded panels of the present invention are particularly suitable as wainscot panels. The panels are reverse molded to provide a "profile up" configuration. The reverse molding approach permits mounting the panel directly against a wall versus the prior art method requiring "shim spacers" (see FIG. 6A), thereby promoting easy installation while integrating excellent aesthetics of a wainscot panel. Historic treatments of real wood wainscot are well established and very expensive. Beyond the multiple piece millwork of real wood, some gypsum and polymeric materials have been fabricated into wainscot panels, but are marginally commercially acceptable, partly because they do not have the feel or look of natural wood. There are no wood fiber composite reverse molded wainscot systems available that provide the ease of application that is achieved in accordance with the principles of the present invention.

SUMMARY OF THE INVENTION

In brief, the present invention is directed to a reverse molded fiberboard panel; a wainscot kit comprising a plurality of differently sized reverse molded panels, and a planar finishing or spacer panel, adapted to completely cover any size wall between a wall base board and a wall chair rail; and a method of reverse molding a loose cellulosic mat, in a single pressing step, to provide one or more relatively high density, raised panels without requiring preliminary pressing, or other pre-shaping step, such as scalping. The reverse-molded panels are molded in a conventional, multi-opening fiberboard press, in a single pressing step process, while achieving excellent transfer of mold detail (embossing fidelity) without visually noticeable fiber fracture. The panels can include a foil, an impregnated paper overlay, or thermoplastic coating materials but do not require an overlay or high resin content coating to achieve excellent embossing fidelity and appearance.

In the preferred embodiment, the loose cellulosic mat that is molded is manufactured by the dry process to provide a smooth, planar back surface surrounding the back surface of the raised, molded panels, rather than a screen back pattern which results from pressed mats made by the wet process. The reverse molded raised panel design provides a raised profile (profile up) that is sharp and crisp with sharp detail in exterior corners that has the appearance and feel of hand crafted natural wood millwork, but actually is a reverse-molded, high density wood composite material that can be adhesively secured to a planar wall, such as gypsum wallboard.

Accordingly, one aspect of the present invention is to provide reverse molded, wood composite articles, and a method of manufacturing the articles, wherein the articles are molded from a loose mat of cellulosic fiber and binder, such that the articles have an upwardly raised panel that simulates natural wood millwork.

Another aspect of the present invention is to provide reverse molded, wood composite articles, and a method of manufacturing the articles, in kit form, such that the articles can be securely adhered to any planar surface, such as a gypsum wallboard, or plaster wall, to fill the entire wall area between a base board and a chair rail, while providing sharp, crisp exterior corners on the reverse molded, raised panel, to simulate natural wood, handcrafted millwork.

Another aspect of the present invention is to provide a wainscot kit comprising a plurality of reverse molded wood composite articles having different widths and a planar panel that can be easily cut to a desired width to fill an entire wall between a base board and a chair rail.

Still another aspect of the present invention is to provide a reverse molded wood composite article that provides exact transferring of mold detail at exterior corners and contours in a single pressing operation without requiring multiple press steps, post mold curing at elevated temperatures, or a foil or a high resin content (5-25%) outer surface portion.

Another aspect of the present invention is to provide reverse molded wood composite articles that can be molded from cellulosic mats that do not require synthetic fibers, scrim surfaces, layering of short and long fibers, resin-impregnated paper overlays, thermoplastic varnishes, or needling (needle punching) to hold the mat together prior to molding.

A further aspect of the present invention is to provide a reverse molded wood composite article that has one or more raised panels including a centrally disposed rectangular panel portion of 5-10 mm in height, surrounded by a raised, molded, contoured millwork design having a plurality of raised, planar steps ascending upwardly and inwardly integral with rounded contours to a rounded top portion that has increased density at a rounded apex, to prevent damage and surface fiber fractures, and has a geometry such that sharp, crisp surface detail is provided, particularly at exterior corners of the millwork geometry, in a single pressing (molding) step, while providing substantially uniform density in all but the rounded apex of the raised, molded rectangular millwork design.

Another aspect of the present invention is to provide a reverse molded wood composite article that can be molded in a strip of multiple parts in a single pressing (molding) operation and can be cut into separate parts after molding and then coated with a water-based and/or solvent-based coating material, e.g., paint or stain.

Still another aspect of the present invention is to provide a wainscot kit that includes a plurality of reverse molded wood composite articles to provide at least two differing raised panel (window) sizes, at least two different composite article widths, wherein a smaller width composite article has a proportionately smaller raised panel width, and a planar spacer panel, so that the combination of composite articles can completely fill a wall between a base board and a chair rail by cutting the planar spacer panel to size at inside wall corners for covering the full wall width up to the chair rail. More particularly, the preferred reverse molded articles in the kit are provided in widths of 12 inches, 16 inches and 48 inches with the 12 inch and 16 inch widths having windows (raised panels) of different sizes; and the 48 inch wide article having three windows of a size to match either the 12 inch wide or 16 inch wide article.

Another aspect of the present invention is to provide a reverse molded wood composite article that has one or more raised panels comprising a central, planar raised portion surrounded by a rectangular raised millwork design, the raised panels being surrounded by planar stiles and rails wherein the raised panels are capable of being separated from the surrounding planar stiles and rails, e.g., via sawing or back sanding, from the surrounding planar base so that the separated panels can be adhered to a household door, cabinet door, shutters, furniture, library or millwork walls, or as a framing material by further removing the central planar raised panel portion.

The above and other aspects and advantages of the present invention will become more apparent from the following detailed description of the preferred embodiments, taken in conjunction with the drawings.

BRIEF DESCRIPTION OF THE DRAWINGS

FIG. 2 is a partially broken-away perspective view of the reverse molded wainscot wood composite article of the present invention showing the preferred geometry of the raised panels;

FIG. 6 is a side view of the wood composite wainscot article of the present invention adhered to drywall between a base board and a chair rail, taken along the line 6-6 of FIG. 7;

FIG. 6A is a side view, similar to FIG. 6, showing a prior art wainscot article secured to drywall with shim spacers.

BRIEF DESCRIPTION OF THE PREFERRED EMBODIMENTS

Figure 1:
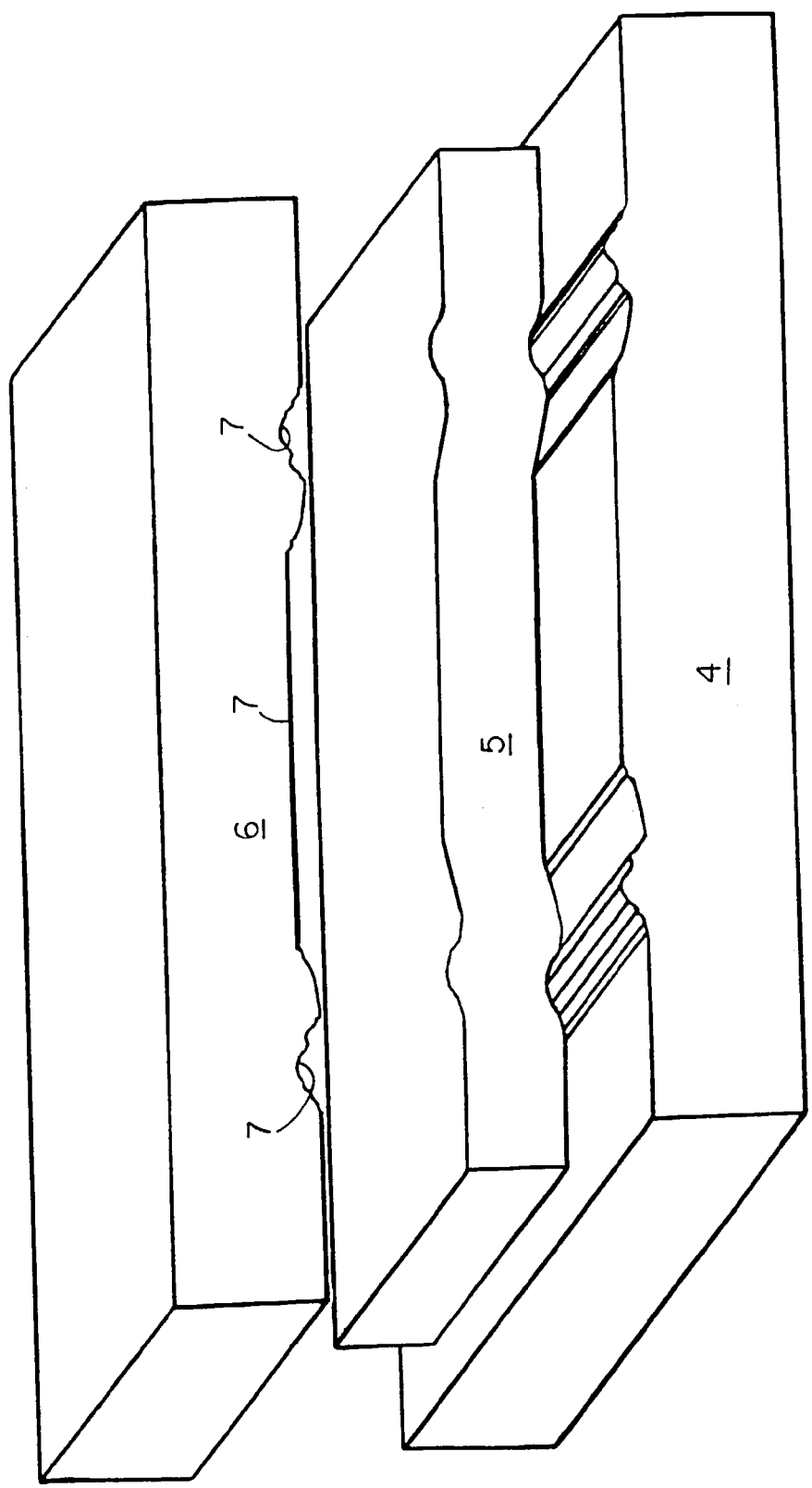
FIG. 1 is a partially broken-away perspective view of a loose, dry-laid composite cellulosic mat laid between a lower mold cavity and an upper mold core, showing the mat being loose enough to contour over the raised panel contours of the mold cavity prior to pressing.

In the preferred embodiment shown in the drawings, the molded wood composite articles of the present invention are molded in the form of wainscot paneling to be adhered to a planar interior wall between a wall base board and a wall chair rail, to simulate solid, natural wood wainscot millwork, as shown in FIG. 2. It should be understood, however, that the principles of the present invention apply to much more than the manufacture of wainscot and also applies to the manufacture of doors or door skins, particularly cabinet door facings, as well as any molded, man-made composite wood article that includes one or more reverse-molded raised millwork designs adjacent to a planar surface portion of the molded article. Examples of other composite, reverse-molded wood articles that are capable of being manufactured in accordance with the principles of the present invention include decorative hardboard; interior and exterior passage door skins, cabinet door skins, and garage door skins; decorative interior wall paneling; cabinetry and furniture surface moldings; molded panels separated from their surrounding planar portions to be adhered to an outer planar surface of a cabinet, cabinet door, or planar furniture portion; furniture components; and the like.

The dimensions of the reverse molded composite articles of the present invention preferably varies from 5 inches to 96 inches in width and from 12 inches to 60 inches or even 96 inches in height.

The articles of the present invention preferably are formed from at least 80% by weight fibrillated cellulosic fibers, based on the total, dry weight of fibers in the articles, and a binder capable of adhering the cellulosic fibers together into a structurally stable, consolidated article. The cellulosic fibers are in the form of refined, fibrillated fibers and can be molded and adhered together with natural or synthetic binders to provide aesthetically pleasing molded contours, and smooth or wood grain texture surfaces in all exterior, visible surfaces, including the molded, raised panel surfaces. The articles of the present invention can be molded as a thin, e.g., 0.1 to 0.3 inch wainscot, or raised panels can be cut or back sanded to remove the raised panels for adherence to a cabinet door or the like to provide a raised, hand-crafted, natural wood millwork look onto any planar surface.

In accordance with the present invention, the reverse-molded articles of the present invention can be adhesively applied or otherwise fastened to any planar support structure.

Turning now to the drawings, and initially to FIG. 1, there is illustrated a partially broken-away perspective view of a portion of a mold, including a lower mold half or mold cavity 4, having a partially broken-away cellulosic mat 5 laid thereover, and an upper mold core 6, for pressing the mat 5 into a wainscot panel, generally designated by reference numeral 10. The upper mold core 6 has a mold depression 7 in its undersurface that is shaped complementary to the upwardly extending mold design shown in lower mold cavity 4 for pressing the mat 5 therebetween to conform to a mold cavity between the mold halves 4 and 6. The wainscot panel 10 is reverse molded, as shown in FIGS. 1 and 2, between the raised panel-simulating lower mold cavity 4, and the upper mold core 6, to provide raised panels 12 in the molded article 10, including centrally disposed, planar raised panel portions 13, and rectangular contoured wall portions, generally designated by reference numeral 14, including raised exterior corners 15 on the panel outer surfaces that correspond to contours essentially identical to raised contours of the lower mold cavity 4. The reverse molded panel 10 can be secured, e.g., adhesively, or via fasteners, such as nails or screws, to a suitable planar surface, such as a wainscot wall area of an interior home room. The lower mold cavity 4 is essentially the same in general contour as an upper surface of the wainscot panel 10, except that the lower mold cavity 4 would be slightly smaller horizontally, in the raised panel dimensions, to allow for the thickness of the molded cellulosic mat 5 that is molded to the upwardly extending raised panel design shown in FIG. 2. The upper mold core 6 carries a raised panel-receiving mold cavity 7 dimensioned complementary to the upper surface of the raised panel structure 12, and can be smoothly contoured or can include downwardly extending structure (not shown) to emboss simulated wood grain ticks that form a wood grain pattern.

Figure 3:
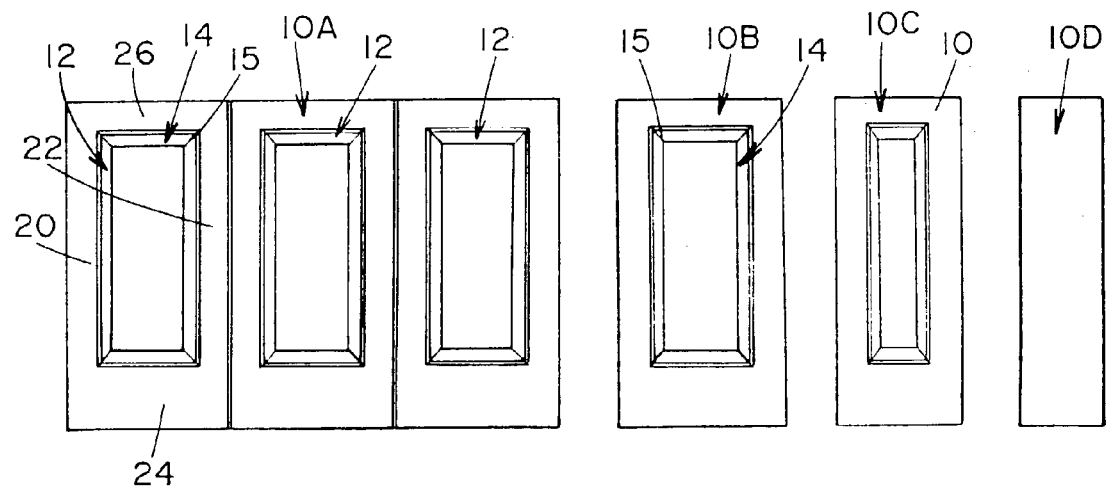
FIG. 3 is a front view of the components of a wainscot kit comprising four different articles—three reverse molded panels and one planar panel—capable of completely filling a wall between a base board and a chair rail while only cutting the planar panel to size to fill the entire wall up to the chair rail.

The wainscot panel 10 is molded with the mold cavity, disposed between die halves 4 and 6, disposed in a generally horizontal disposition so that the upper major surface will be described as horizontal—corresponding to its disposition during molding—and it will be recognized that the position of the molded article, in use, is usually intended to be vertical, instead of horizontal, as in the case of wainscot panel 10, as shown in FIGS. 2-7. The "raised profile up" molded outer major surface of the wainscot panels 10 is disposed in a vertical orientation ("raised profile out") between a wall base board 16 and a wall chair rail 18, as shown in FIG. 6. The exemplary wainscot panel 10, shown in FIG. 2, in the preferred embodiment, includes one or more of the raised panels 12, which are molded to provide contoured walls, generally designated by reference numeral 14, integral with and surrounding the centrally disposed planar raised panel portion 13, and the contoured walls 14 are integral with and surrounded by planar vertical stiles 20 and 22 and horizontal rails 24 and 26, respectively, lying in a common plane, for adhesive securement of an undersurface of each stile and rail 20, 22, 24 and 26 to a planar wall, as shown in FIGS. 3 and 6.

Figure 4:
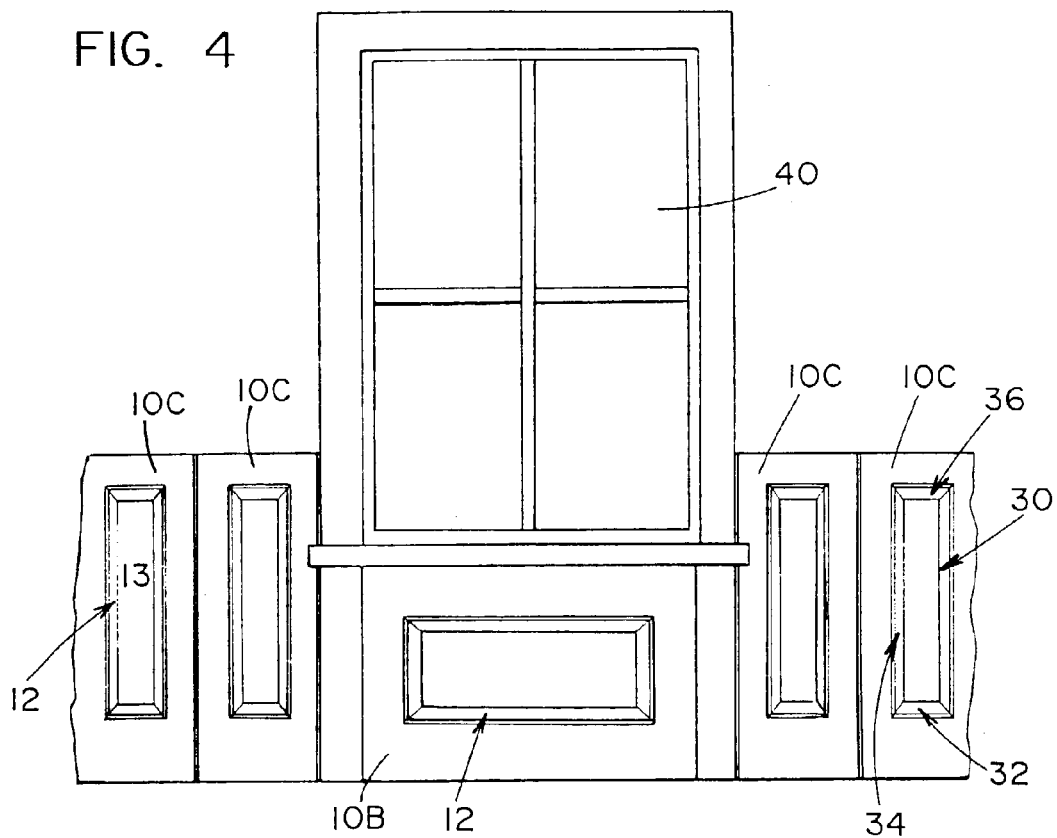
FIG. 4 is a partially broken-away front view of a portion of a wall containing an oversized window, showing one way to fit the kit of FIG. 3 onto a wall having an oversized window.
Figure 5:
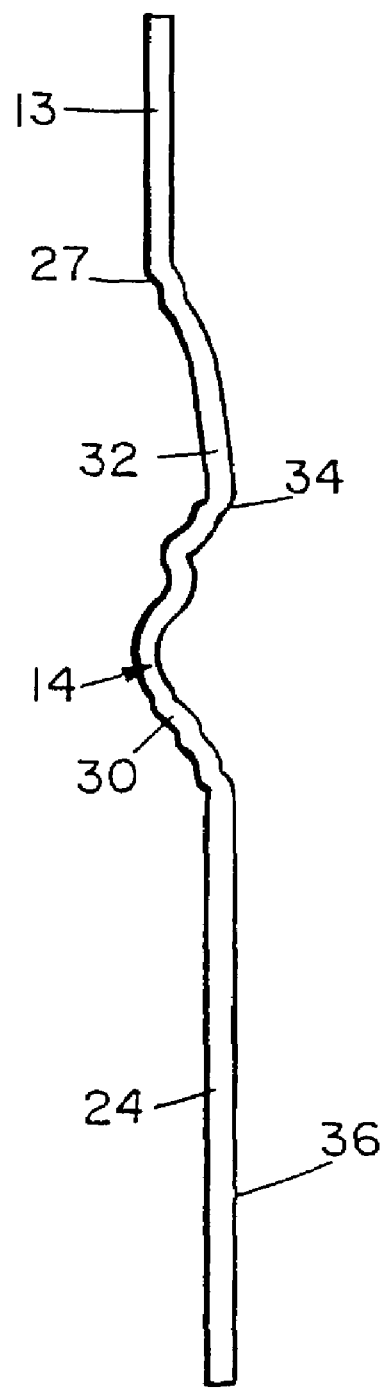
FIG. 5 is a partially broken-away side view of the reverse molded wood composite article of the present invention showing the profile of the reverse-molded raised panel design.
Figure 7:
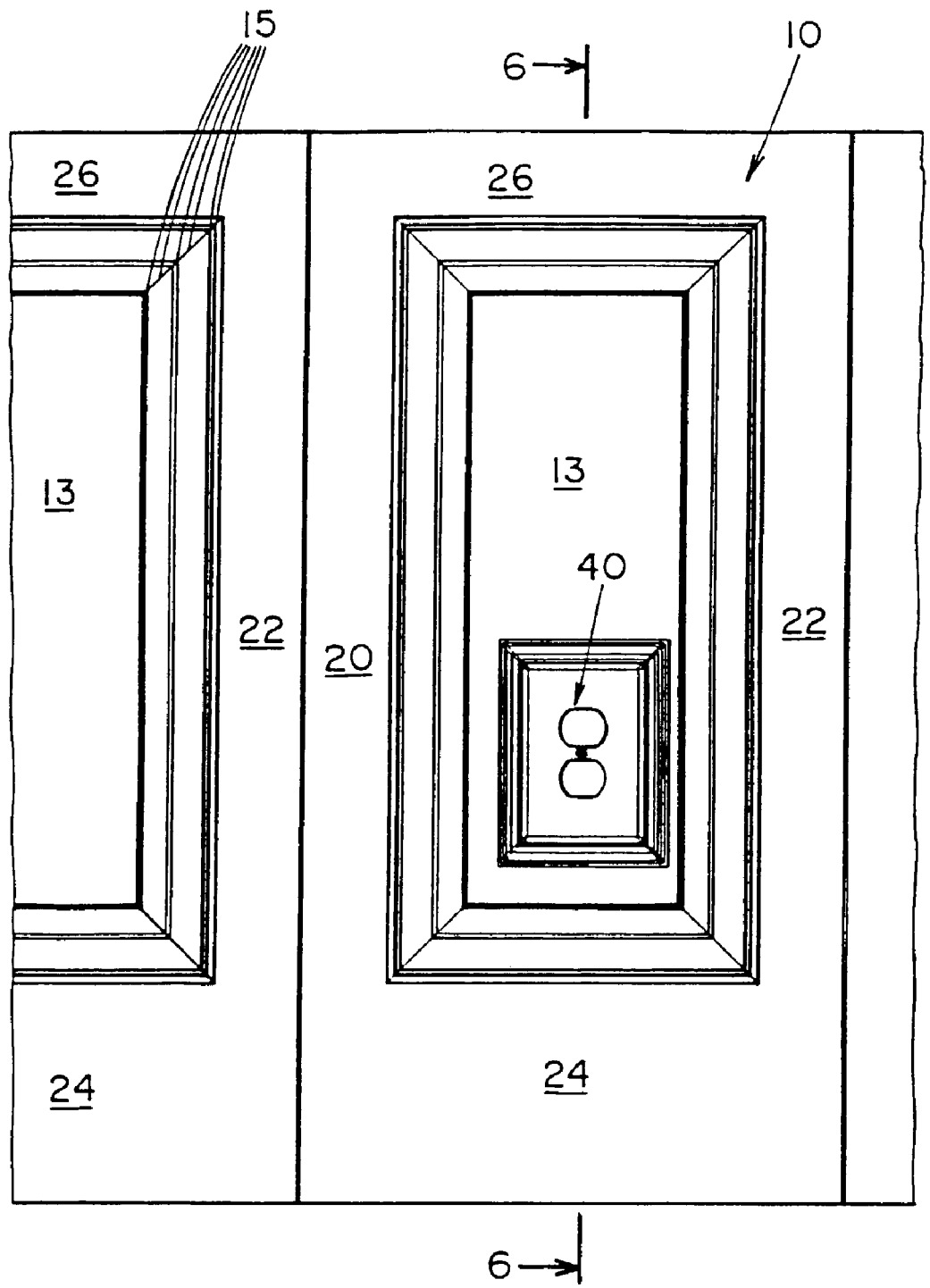
FIG. 7 is a front view of the wood composite wainscot article of the present invention secured to a wall and showing a new design for a switch plate that can be secured to the wall through the wainscot article, even if the electrical outlet falls within the raised panel design.

In the preferred wainscot panel 10, best shown in FIGS. 2-4, the reverse molded contoured walls 14 are molded in a rectangular shape, surrounding the centrally disposed planar panel portion 13, and the contoured walls 14 are interconnected to outer edges 27 of the planar panel portion 13 through sloping walls 28, disposed therebetween. As best shown in the panel profiles of FIGS. 5 and 6, the contoured walls 14 include a wall portion 30 that is integral with and extends upwardly from an adjacent stile or rail (24, as shown in FIG. 5) at an angle of about 25° to about 35° above horizontal (as molded in the horizontal position). Wall portion 30 then is curved downwardly in a generally U-shaped contoured wall portion 32 integral at its outer end with wall portion 30, and integral at its inner end with the planar, raised panel portion 13, at outer edges 27 (FIGS. 2 and 5) of the planar, raised panel portion 13. Each of the four contoured walls 14 that form the reverse molded rectangles of each raised panel 12 are of identical contour. In accordance with the preferred embodiment, U-shaped contoured wall portion 32 is contoured such that an innermost undersurface 34 (as applied against a wall) of the contoured wall portion 32, at the base of the U, lies in the same plane as an undersurface 36 of the stiles and rails 20, 22, 24 and 26, so that the undersurface 34 of U-shaped wall portion 32, at the base of the U, contacts, and can be adhered to, wall 37 for structural support when in position (as shown in FIG. 6).

The articles of the present invention are molded from a loose mat of cellulosic fibers and a thermosetting binder, such as a urea formaldehyde, melamine formaldehyde, and/or phenol formaldehyde binder commonly used in the manufacture of fiberboard. The mat should include at least about 80% fibrillated, refined cellulosic fibers, preferably 100%, based on the total, dry fiber weight in the mat 5. The fibers are mechanically refined from wood chips preferably using steam pressures in the range of about 80 to 120 psi, more preferably about 100 to 110 psi, most preferably about 105 psi. Steam pressures higher than about 120 psi in refining the cellulosic fibers produce highly refined fibers that are useful in accordance with the present invention, but the cost of refining would be commercially prohibitive.

Such refining of cellulosic fibers will provide fibrillated cellulosic fibers that are preferably dry laid into a loose cellulosic fiber mat having a basis weight in the range of 0.58 to 0.62 pounds per cubic inch. Upon molding in a heated press at a temperature in the range of about 385° F. to 450° F., and at a maximum pressure in the range of about 550 to about 850 psi, the resulting embossed articles will have a specific gravity in the range of about 0.96 to about 1.08, preferably about 0.98 to about 1.06, more preferably about 1.00 to about 1.04. Articles of the present invention that are "profile up" compensate to increase density and surface toughness by reducing caliper at the highest point in the design profile to about 1.02 to about 1.08 specific gravity, with a target of 1.02 to 1.04 specific gravity, whether smooth or textured. The flat surface geometry surrounding the profile zones is pressed to a slightly lower specific gravity of 1.00 to 0.98 by slightly increasing the caliper within these zones.

In accordance with another important embodiment of the present invention, the reverse molded panels 10 of the present invention can be produced in a plurality of widths, as shown in FIG. 3, for example, a molded panel 10A that is, for example, 48 inches wide, having three raised panels 12, a panel 10B that is, for example, 16 inches wide, having a single raised panel 12; a panel 10C that is, for example, 12 inches wide, having a single raised panel 12; and a planar panel 10D that is, for example, 8 inches wide, and can be cut easily lengthwise, to complete a wall. Each panel 10A, 10B, 10C and 10D is the same height of, for example, 32 inches—a standard wainscot height. As shown in FIG. 3, the panels, e.g., 10B or 10C, can be arranged under windows 40, by rotating the panel (10B, as shown in FIG. 3) 90° so that the raised panel 12 has its length in a horizontal disposition and, if necessary, when windows are lower to the floor, panel 10C can be used instead, together with one or two planar panels 10D above and/or below panel 10C.

The wainscot kit shown in FIG. 2 can be easily installed by the homeowner by starting at the center of the room, or directly under a center window, and arranging the panels symmetrically toward inside corners of the spaced wall ends. By arranging the panels 10B and/or 10C properly, the 8 inch width planar panels 10D will be of sufficient width to fill all walls, to the wall ends, defined at inside room corners, and can be cut accurately to completely fill the wall.

In accordance with another aspect of the present invention, electrical light switch plates (not shown) and outlet covers, generally and collectively referred to by reference numeral 40 (FIG. 7), are provided in the kit shown in FIG. 3. These outlet covers 40 and switch plates (not shown) are rectangular and have outermost vertical walls 42 that are at least as high as the raised contoured walls 14 and planar raised panel portions 13 of panels 12 so that wherever the light switch plates and/or electrical outlet covers 40 are positioned within the wainscot panels 10, a hole is cut in the panels 12 to the same outer dimensions as the switch plate cover or outlet cover 40, and the outlet cover 40 is inserted against the wall (within the panel), without exposing a cut panel, since the cuts in panel 12 will be flush against the outermost walls 42 of the outlet cover 40, as shown in FIG. 8.

The foregoing description is given for clearness of understanding only, and no unnecessary limitations should be understood therefrom, as modifications within the scope of the invention may be apparent to those skilled in the art.

What is claimed is:

1. A door, comprising:
    a structural support; and
    first and second composite wood door skins, each door skin having an interior surface secured to said structural support and an opposite exterior surface exteriorly disposed as an exterior surface of said door, at least one of said door skins comprising a major planar portion lying in a first plane, a planar panel portion lying in a second plane spaced from the first plane, and a contoured wall surrounding said planar panel portion and interconnecting and integral with said major planar portion and said planar panel portion, said door skin reverse molded with at least a portion of said contoured wall extending outwardly relative to said first plane and said exterior surface of the door in an exterior direction of the door, wherein said outwardly extending contoured wall portion has a lesser thickness than said major planar portion.

2. The door of claim 1, wherein said planar panel portion is disposed outwardly relative to said major planar portion.

3. The door of claim 1, wherein said contoured wall includes a first portion including a rounded top proximate said major planar portion and a second portion proximate said planar panel portion.

4. The door of claim 1, wherein said outwardly extending contoured wall portion includes an apex.

5. The door of claim 4, wherein said apex includes a rounded top.

6. The door of claim 5, wherein said contoured wall further comprises a plurality of raised planar steps interposed between said major planar portion and said rounded top.

7. The door of claim 1, wherein said contoured wall includes a first contoured portion adjacent said major planar portion and a second contoured portion adjacent said planar panel portion.

8. The door of claim 7, wherein said first contoured portion extends outwardly from said first plane and said second contoured portion extends inwardly relative to said first plane.

9. The door of claim 1, wherein said contoured wall extends outwardly from said first plane at an angle of about 25° to about 35°.

10. The door of claim 1, wherein said door skin comprises a plurality of planar panel portions, and wherein each one of said planar panel portions is rectangular.

11. The door of claim 1, wherein said contoured wall is rectangular in plan.

12. The door of claim 1, wherein said door skin is formed from at least forty percent by weight wood fiber selected from the group consisting of pine and fir.

13. The door of claim 1, wherein said door skin is formed of hardboard.

14. The door of claim 1, wherein the door skin is reverse molded from a mat of refined cellulosic fibers and sufficient binder to adhere the cellulosic fibers together into a structurally sound article having a specific gravity in the range of about 0.96 to about 1.08, said mat formed from at least 80% by weight fibrillated cellulosic fibers refined from wood chips, based on the total dry weight of the fibers in the mat.

15. The door of claim 1, wherein said outwardly extending contoured wall portion has a specific gravity that is greater than the specific gravity of said major planar portion.

16. The door of claim 15, wherein the specific gravity of said outwardly extending contoured wall portion is in a range of 1.02 to 1.08, and wherein the specific gravity of said major planar portion is in a range of 0.98 to 1.00.

17. A door, comprising:
    a structural support; and
    first and second composite wood door skins, each door skin having an interior surface secured to said structural support and an opposite exterior surface exteriorly disposed as an exterior surface of said door, at least one of said door skins comprising a major planar portion, a planar panel portion, and a contoured wall surrounding said planar panel portion and interconnecting and integral with said major planar portion and said planar panel portion, said door skin reverse molded to provide said contoured wall with an outwardly extending portion protruding outwardly from said major planar portion relative to said exterior surface of the door and a co-planar portion extending between said outwardly extending portion and said planar panel portion, said outwardly extending portion of said contoured wall having a lesser thickness than said major planar portion, said interior surface of said co-planar portion of said contoured wall being co-planar with said interior surface of said major planar portion.

18. The door skin of claim 17, wherein the door skin is reverse molded from a mat of refined cellulosic fibers and sufficient binder to adhere the cellulosic fibers together into a structurally sound article having a specific gravity in the range of about 0.96 to about 1.08, said mat formed from at least 80% by weight fibrillated cellulosic fibers refined from wood chips, based on the total dry weight of the fibers in the mat.

19. The door skin of claim 17, wherein said outwardly extending contoured wall portion has a specific gravity that is greater than the specific gravity of said major planar portion.

20. The door skin of claim 19, wherein the specific gravity of said outwardly extending contoured wall portion is in a range of 1.02 to 1.08, and wherein the specific gravity of said major planar portion is in a range of 0.98 to 1.00.

21. A door, comprising:
a structural support; and
first and second composite wood door skins, each door skin having an interior surface secured to said structural support and an opposite exterior surface exteriorly disposed as an exterior surface of said door, at least one of said door skins comprising a major planar portion lying in a first plane, a planar panel portion, and a contoured wall surrounding said planar panel portion and interconnecting and integral with said major planar portion and said planar panel portion, said door skin reverse molded to provide said contoured wall with an outwardly extending portion lying in a second plane disposed outwardly relative to the first plane and a co-planar portion lying in the first plane so that said interior surface of said co-planar portion is co-planar with said interior surface of said major planar portion, said outwardly extending portion of said contoured wall having a lesser thickness than said major planar portion.

22. The door skin of claim 21, wherein the door skin is reverse molded from a mat of refined cellulosic fibers and sufficient binder to adhere the cellulosic fibers together into a structurally sound article having a specific gravity in the range of about 0.96 to about 1.08, said mat formed from at least 80% by weight fibrillated cellulosic fibers refined from wood chips, based on the total dry weight of the fibers in the mat.

23. The door skin of claim 21, wherein said outwardly extending contoured wall portion has a specific gravity that is greater than the specific gravity of said major planar portion.

24. The door skin of claim 23, wherein the specific gravity of said outwardly extending contoured wall portion is in a range of 1.02 to 1.08, and wherein the specific gravity of said major planar portion is in a range of 0.98 to 1.00.

* * * * *